United States Patent [19]

Ruggiero et al.

[11] Patent Number: 5,460,632
[45] Date of Patent: Oct. 24, 1995

[54] LOW-FOAMING, ENHANCED WETTING DYE-LEVELING AGENT

[75] Inventors: Murray A. Ruggiero, East Haven; Bruce A. Marien, Woodbridge, both of Conn.

[73] Assignee: Olin Corporation, Cheshire, Conn.

[21] Appl. No.: 365,872

[22] Filed: Dec. 29, 1994

[51] Int. Cl.$^6$ ................................................ C09B 67/00
[52] U.S. Cl. ............... 8/552; 8/557; 8/576; 8/590; 8/594; 8/597; 8/604; 8/610; 8/137; 252/174.22; 252/540; 252/545
[58] Field of Search ................... 8/552, 576, 557, 8/590, 594, 597, 604, 610; 252/174.22, 540, 545

[56] References Cited

U.S. PATENT DOCUMENTS

| | | | |
|---|---|---|---|
| 3,264,242 | 8/1966 | Teot | 250/29.6 |
| 3,592,584 | 7/1971 | Link et al. | 8/26 |
| 3,634,272 | 1/1972 | Valenta et al. | 252/153 |
| 3,684,426 | 8/1972 | Bindler et al. | 8/15 |
| 3,945,437 | 3/1976 | Chiu et al. | 166/305 R |
| 3,956,401 | 5/1976 | Scardera et al. | 260/615 B |
| 4,898,621 | 2/1990 | Pruehs et al. | 134/25.2 |
| 4,925,587 | 5/1990 | Schenker et al. | 252/174.22 |
| 4,968,394 | 11/1990 | Dotson et al. | 204/101 |
| 5,030,245 | 7/1991 | Hemling et al. | 8/560 |
| 5,196,146 | 3/1993 | Farella et al. | 252/542 |
| 5,360,457 | 11/1994 | Ruggiero et al. | 8/567 |

Primary Examiner—Margaret Einsmann
Attorney, Agent, or Firm—Dale L. Carlson

[57] ABSTRACT

The present invention relates to an acid dye-leveling composition that is useful for imparting a dye leveling characteristic to fibers prior to, or during, the fiber dyeing operation. Also described is a process for preparing the dye-leveling composition, as well as a process for using the composition in the dyeing of fibers. The composition is particularly useful for treating polyamide fibers, such as nylon, but is also suitably used in the treatment of silk, wool, and other synthetic and natural fibers. The composition is also useful as a hard surface cleaner, adhesive additive, and a leveling agent for paints.

12 Claims, No Drawings

LOW-FOAMING, ENHANCED WETTING DYE-LEVELING AGENT

FIELD OF THE INVENTION

The present invention relates generally to dye-leveling agents for fibers as well as cleaning agents and spot removers for fibers, and more specifically to a dye-leveling composition that provides advantageous fiber wetting during dye-leveling and/or cleaning of the fibers.

BACKGROUND OF THE INVENTION

Acid dyes applied to polyamide, nylon and wood fibers have a tendency to dye at the point of initial contact. The rapid reaction between the dye and the fiber at the point of initial contact, can cause an uneven appearance or coloration to develop in the dyed fiber. This problem can be exacerbated when several dyes are used to produce a desired shade on the fiber, typically compounding the uneven coloration problem. In addition, the dyes may react at different rates to produce a separation of colors on the fiber. To alleviate this problem, a variety of materials, so-called "dye-leveling agents", have been used to produce a level dye application. These dye-leveling agents, are typically surfactants selected from anionic, cationic, nonionic, and amphoteric classes of surfactants, with anionic being the most common form.

Thus, dye leveling agents are used in the process of dyeing fibers, such as nylon, wool and silk in order to give an even coverage by the dye on the fiber being dyed. Anionic surfactants such as alkyl diphenyloxide disulfonate (commercially available under the trademark DOWFAX 2A-1, a product of Dow Chemical Corp.), are typically used as leveling agents. An inherent disadvantage of using these products is that they tend to be poor wetters and high foamers. The wetting ability of the dye bath is particularly important when dyeing nylon fibers which have been treated with a fluorochemical. To alleviate these wetting and foaming problems, auxiliary wetting agents and defoaming agents are typically added to the dye bath. In addition to the cost of these auxiliary agents, their use can increase the chance of mixing and measuring errors, as well as increase the inventory requirement of chemicals needed either as part of the mixing operation or to correct measurement errors that occur.

A common problem encountered when dyeing natural and/or synthetic fibers, such as wool fibers or polyamide fibers, is the tendency of the dye to provide uneven coloration of the fiber. In essence, the dye more rapidly reacts at the point of initial contact with the fiber, thus giving an uneven appearance to the dyed fiber. This problem is accentuated when several dyes are utilized to produce a desired shading on the fiber. For example, the dyes may react at different rates to produce a separation of colors, causing a variation in shading at different points along the fiber and resulting in what is commonly referred to as "poor shade depth".

To alleviate the above problems, various materials have been suggested in the past to provide level fiber dyeing. These materials, commonly referred to as "dye-leveling agents", have in the past frequently contained anionic surfactants, such as alkyl diphenyloxide disulfonate. By way of illustration, alkyl diphenyloxide disulfonate has been used commercially as an acid dye-leveling agent. However, this disulfonate has the disadvantage of providing higher foaming and poorer wetting (as measured by a draves wetting test) than might be desired, as well as being limited in its usefulness to a relatively narrow pH range. In addition, as demonstrated in Comparative Example A, at column 8, lines 55–67 of U.S. Pat. No. 5,030,245, a dye-leveling agent consisting essentially of such an alkyl diphenyloxide disulfonate (which in that example was DOWFAX 2A-1 alkyl diphenyloxide disulfonate, a product of Dow Chemical Company), did not result in a full dye shade development in the dyeing of nylon carpet. Further, alkyl diphenyloxide disulfonate surfactants such as DOWFAX 2A-1 surfactant tend to contribute to poorer fiber wetting by the dye bath composition and higher foaming in the dye bath than otherwise might be desired. Accordingly, the search has continued for improved dye-leveling compositions that do not suffer from these poor wetting and high foaming problems.

The prior art is replete with various attempts to provide good dye-leveling agents to the carpet dyeing industry. By way of illustration, the above-mentioned '245 patent discloses a combination dye-leveling agent/stainblocker comprising a polycarboxylated linear alcohol alkoxylate as the dye-leveling agent and a sulfonated phenolformaldehyde diphenylsulfone condensate as the stainblocker, alone or together with an alkoxylated linear alcohol alkoxylate as a wetting agent. Although these compositions provide good dye-leveling in use with acid dyestuffs, there is still a need in the dyeing industry for further improvement.

U.S. Pat. No. 3,684,426 describes alkyl diphenylether disulfonate together with an ethoxylate quaternary ammonium compound as pretreatment for improved dyeing of synthetic polyamide fibers.

Although various salts of hydroxylamine, such as hydroxylammonium nitrate (so-called "HAN"), which is the nitrate salt of hydroxylamine, are known, their use in the dyeing industry is not known to the knowledge of the present inventors. HAN is an excellent insensitive oxidizer for propellants, as disclosed, for example, in U.S. Pat. No. 4,968,394, the disclosure of which is more specifically directed to a method for reducing excess nitric acid in aqueous hydroxylamine nitrate solutions.

U.S. Pat. No. 3,592,584 discloses a dyeing composition for polyamide fibers comprising a combination of a premetallized dye and a dyeing assistant selected from the group consisting of dodecylbenzene sulfonic acid, diethanolamine, and disodium dodecyldiphenylether disulfonate. However, these compositions have proved less effective in providing streak-free, even dyeings of fibers than might be desired.

New dye-leveling compositions that are low in foaming and provide good fiber wetting, and are useful in facilitating level dyeing and good shade depth development during the fiber dyeing process, would be highly desired by the fiber dyeing community. If such new dye-leveling agents are usable in conjunction with a wide variety of dyestuffs for dyeing a variety of natural and synthetic fibers, such as wool, silk, and polyamide, these dye-leveling agents would be particularly advantageous to the fiber dyeing industry.

Recently, a solution to this dye-leveling problem has been proposed using the reaction product of a piperazine compound with an alkyl diphenyl ether sulfonic acid, as-described in U.S. Pat. No. 5,360,457. Likewise, certain 2-piperazinones (which contain keto-substitution on the ring) are disclosed in compositions containing alkylated diphenyl oxide sulfonate surfactant, alone or in combination with a nonionic surfactant that may contain a mixture of ethoxylated and propoxylated alcohol, as taught in U.S. Pat. No. 5,196,146. The '146 patent focuses upon hard surface cleaner compositions for cleaning grease and oil from metal, plastic, and glass, all material that are not subject to the dye leveling problem encountered by the fiber dyeing industry.

The present invention provides another solution to this dye leveling problem for the fiber industry.

SUMMARY OF THE INVENTION

In one aspect, the present invention relates to a composition concentrate comprising:

(a) a hydroxylamine-substituted organosulfonate, (b) an organic or inorganic salt of a polycarboxylated alcohol alkoxylate, and (c) an alcohol alkoxylate, wherein the amount of component (a) is between about 20 and about 75 weight percent, component (b) is present in an amount of between about 2.5 and about 25 weight percent, and component (c) being between about 10 and about 75 weight percent, all weight percents being based upon the weight of said composition concentrate.

In another aspect, the present invention relates to a "working" composition comprising water and the above-described concentrate, wherein said concentrate is present in said composition in an amount of between about 0.01 weight percent and about 20 weight percent, based upon the weight of said composition.

In yet another aspect, the present invention relates to a composition comprising:

(a) the reaction product of a hydroxylamine salt (preferably hydroxylammonium nitrate or hydroxylammonium sulfate) and an alkyl diphenyl ether sulfonic acid, (b) the reaction product of a base (which can also be a hydroxylamine salt) and a polycarboxylated linear alcohol alkoxylate acid, and (c) a linear alcohol alkoxylate.

In still another aspect, the present invention relates to a composition useful for dyeing fibers comprising (a) a dye and (b) a dye-leveling agent comprising:

(1) the reaction product of a hydroxylamine salt and an alkyl diphenyl ether sulfonic acid, (2) the reaction product of a base and a polycarboxylated linear alcohol alkoxylate acid, and (3) a linear alcohol alkoxylate, said dye-leveling agent being present in a dye-leveling effective amount.

In yet another aspect, the present invention relates to a process for preparing a dye-leveling composition which comprises the steps of:

(a) reacting a hydroxylamine salt selected from the group consisting of hydroxylammonium nitrate and hydroxylammonium sulfate, and combinations thereof, with an aralkyl ether sulfonate to provide a hydroxylaminesubstituted aralkyl ether sulfonic acid, (b) contacting said hydroxylamine-substituted aralkyl ether sulfonic acid with a mixture comprising an alcohol alkoxylate and a polycarboxylated alcohol alkoxylate acid to provide a hydroxylamine-containing mixture, and (c) neutralizing at least a portion of said polycarboxylated alcohol alkoxylate acid in said hydroxylamine-containing mixture with an organic or inorganic base in order to form a salt of said polycarboxylated alcohol alkoxylate.

In still another aspect, the present invention relates to a fiber cleaning composition comprising (a) a base fluid medium comprising water or an organic solvent, or a combination thereof, and (b) a cleaning agent comprising (and advantageously consisting essentially of):

(1) the reaction product of a hydroxylamine salt and an alkyl diphenyl ether sulfonic acid, (2) the reaction product of a base and a polycarboxylated linear alcohol alkoxylate acid, and (3) a linear alcohol alkoxylate.

In yet another aspect, the present invention relates to an aqueous dye-leveling composition concentrate comprising:

(a) a hydroxylamine-substituted organosulfonate dye-leveling agent, (b) an alcohol alkoxylate diluent, and (c) water, wherein the amount of component (a) is between about 40% and about 80% (preferably between about 70% and about 80%), the amount of component (b) is between about 10% and about 55% (preferably between about 30% and about 50%), and the amount of component (c) is between about 2% and about 20% (preferably between about 2% and about 10%), all percents being by weight based upon the weight of the aqueous dye-leveling composition concentrate.

In another aspect, the present invention relates to a "working" composition comprising the above-described aqueous dye-leveling composition concentrate and added water, wherein said concentrate is present in said composition in an amount of between about 0.01 weight percent and about 50 weight percent, based upon the weight of said composition.

In yet another aspect, the present invention relates to a composition comprising (and advantageously consisting essentially of):

(a) the reaction product of a hydroxylamine salt and an alkyl diphenyl ether sulfonic acid, and (b) an alcohol alkoxylate (preferably a linear alcohol alkoxylate).

In still another aspect, the present invention relates to a composition useful for dyeing fibers comprising (a) a dye and (b) a dye-leveling agent comprising (and advantageously consisting essentially of):

(i) the reaction product of a hydroxylamine salt and an alkyl diphenyl ether sulfonic acid, and (ii) an alcohol alkoxylate (preferably a linear alcohol alkoxylate).

In yet another aspect, the present invention relates to a process for preparing a dye-leveling composition which comprises the steps of:

(a) reacting a hydroxylamine salt and an aralkyl ether sulfonic acid to produce a hydroxylamine-substituted aralkyl ether sulfonic acid, (b) contacting said hydroxylamine-substituted aralkyl ether sulfonic acid with an alcohol alkoxylate diluent to provide said diluent-containing dye-leveling composition.

In still another aspect, the present invention relates to a cleaning composition for cleaning fibers or hard surfaces comprising (a) a base fluid medium comprising water or an organic solvent, or a combination thereof, and (b) a cleaning agent comprising (and advantageously consisting essentially of):

(i) the reaction product of a hydroxylamine salt with an alkyl diphenyl ether sulfonic acid, and (ii) an alcohol alkoxylate (preferably a linear alcohol alkoxylate).

In yet another aspect, the present invention relates to a process for cleaning fibers or a hard surface which comprises contacting said fibers or said hard surface with a cleaning composition comprising (a) a base fluid medium comprising water or an organic solvent, or a combination thereof, and (b) a cleaning agent comprising (and advantageously consisting essentially of):

(i) the reaction product of a hydroxylamine salt with an alkyl diphenyl ether sulfonic acid, and (ii) an alcohol alkoxylate (preferably a linear alcohol alkoxylate).

These and other aspects will become apparent upon reading the following detailed description of the invention.

DETAILED DESCRIPTION OF THE INVENTION

The present inventors have surprisingly discovered an enhanced dye-leveling and cleaning composition that provides an excellent combination of performance efficacy and wetting of the fiber or hard surface substrate being treated. In addition to performing the dye-leveling function, the compositions of the present invention provide built-in wetting efficacy, a particularly advantageous characteristic in the continuous dyeing of nylon carpet where residence time available during the wet-out and dye applicator stages is typically minimal.

It has now been surprisingly found in accordance with the present invention that a dye-leveling composition comprising (and advantageously consisting essentially of) a multi-component mixture of anionic and nonionic surfactants provides extraordinary fiber surface wetting characteristics, as measured by draves wetting test values as compared to a commercial disulfonate dye leveling agent, namely POLY-TERGENT® 2A-1 surfactant, and does not cause excessive foaming when incorporated into a dye-bath formulation. The multi-component mixture has surprisingly also been found to be useful as a cleaning agent when employed in fiber cleaning compositions.

The composition concentrate useful in the present invention suitably contains, in addition to a small amount of water, at least two significant components, namely a hydroxylamine substituted organosulfonate and an alcohol alkoxylate. Although it is difficult or impossible to reduce the water content of the composition concentrate to zero, apparently due to the formation of an azeotropic mixture, the amount of water in the concentrate is suitably reduced or minimized utilizing a suitable water separation technique, such as azeotropic distillation, or rotary evaporation (utilizing a separator such as a ROTOVAPOR, as described in Example 3 hereinbelow). An optional defoamer is suitably employed if desired in order to minimize the likelihood of any foaming of the dyeing composition. The concentrate is suitably diluted to provide a "working composition" that lends itself for use either as a hard surface cleaner or as a dye-leveling agent in a dye-bath formulation, or as a fiber cleaner suitable for use as a rug cleaner and/or spot remover for a wide variety of types of carpets (e.g., wool, nylon, silk, and the like), or other fiber-containing material. Further, the dye-leveling composition is suitable for use in neutral pH or basic pH dye baths, such as emulsion dyestuffs, as well as a hard surface cleaner for cleaning hard surfaces, such as concrete, tile, formica, marble, and the like, and also as a leveling agent for paints and as an adhesive additive to promote penetration into the substrate.

The substituted organosulfonate, is suitably produced by reacting, for example, an aralkyl ether sulfonic acid with a hydroxylamine salt, or a combination thereof. Particularly advantageous aralkyl ether sulfonates are those selected from the group consisting of alkylated diphenyl oxide sulfonates having at least one alkyl-substitution on a phenyl ring and wherein said alkyl-substitution is selected from the group consisting of linear, branched, and cyclic alkyl substitutions, and combinations thereof. Preferred hydroxylamine salts are hydroxylammonium nitrate (also called "HAN") and hydroxylammonium sulfate (also called "HAS"), although other hydroxylamine salts, such as hydroxylammonium acetate and hydroxylammonium carbonate are suitably employed, if desired.

During use as a dye-leveling agent, the hydroxylamine-substituted organosulfonate assists in imparting good dye-leveling efficacy to fibers during use. Although not wishing to be bound by any particular theory, it is believed that the hydroxylamine-substituted organosulfonate assists in (1) controlling the transfer of dye off and on fiber, and (2) controlling the rate of dyeing to give an even appearance of dye shade throughout the fiber, during use of the composition of the present invention in treating fibers.

Particularly advantageous for use in preparing the hydroxylamine-substituted organosulfonate described above are the alkylated diphenyl oxide sulfonate anionic surfactants corresponding to the following formula or to a mixture of compounds corresponding to the following formula:

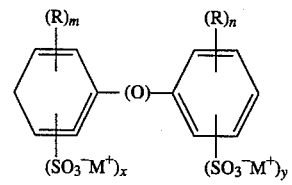

wherein each R is independently a saturated alkyl or substituted saturated alkyl radical or an unsaturated alkyl or substituted unsaturated alkyl radical each m and n is independently 0, 1 or 2; each M is independently hydrogen, an alkali metal, an alkaline earth metal, or ammonium or substituted ammonium; and each x and y are individually 0 or 1. Preferably, each R group is independently an alkyl group having from about 8 to about 24 carbon atoms, even more preferably about 10 to about 20 carbon atoms, and most preferably about 12 to about 16 carbon atoms, with 16 carbon atoms being especially preferred. The alkyl groups can be linear, branched or cyclic, with linear or branched radicals being preferred. The M+ ammonium ion radicals are of the formula $(R')_3NH+$ wherein each R' is independently hydrogen, a $C_1-C_4$ alkyl or a $C_1-C_4$ hydroxyalkyl radical. Illustrative $C_1-C_4$ alkyl or hydroxyalkyl radicals include methyl, ethyl, propyl, isopropyl, butyl, hydroxymethyl and hydroxyethyl. Typical ammonium ion radicals include ammonium ($N+H_4$), methylammonium ($CH_3N+H_3$), ethylammonium ($C_2H_5N+H_3$), dimethylammonium (($CH_3)_2N+H_2$), methylethylammonium ($CH_3N+H_2C_2H_5$), trimethylammonium (($CH_3)_3N+H$) dimethylbutylammonium (($CH_3)_2N+HC_4H_9$) hydroxyethylammonium ($HOCH_2CH_2N+H_3$) and methylhydroxyethylammonium ($CH_3N+H_2CH_2CH_2OH$). Preferably, each M is hydrogen, sodium, calcium, potassium or ammonium.

Alkylated diphenyl oxide sulfonates and their methods of preparation are well-known and reference is made thereto for the purposes of this invention. Representative methods of preparation of sulfonates are disclosed in U.S. Pat. Nos. 3,264,242; 3,634,272; and 3,945,437. Commercial methods of preparation of the alkylated diphenyl oxide sulfonates generally do not produce species which are exclusively monoalkylated, monosulfonated, dialkylated or disulfonated. The commercial available species are predominantly (greater than 90 percent) disulfonated and are a mixture of mono- and dialkylated with the percentage of dialkylation being about 15 to about 25 and the percentage of monoalkylation being about 75 to 85 percent. Most typically, the commercially available species are about 80 percent monoalkylated and 20 percent dialkylated.

Two illustrative commercially available solutions containing alkylated diphenyl oxide sulfonate surfactants are DOWFAX® 8390 and DOWFAX® 8390A surfactants, trademarked products of The Dow Chemical Company. In each, the alkyl group R is predominantly a hexadecyl ($C_{16}$) group. DOWFAX® 8390A typically contains about 25 percent of the acid forms of the surfactant, that is, in which M is hydrogen. DOWFAX® 8390 surfactant typically contains about 35 percent of the sodium salts of the surfactant, that is, in which M is sodium. DOWFAX® 8390A solution fully or partially neutralized with ammonium hydroxide is also suitable for use in the present invention.

The alkylated diphenyl oxide sulfonate compound is suitably reacted with the hydroxylamine salt to produce the desired hydroxylamine-substituted alkylated diphenylether sulfonic acid using a molar ratio of sulfonate compound to hydroxylamine compound of between about 10:1 and about 1:10, preferably between about 2:1 and about 1:2.

The alcohol alkoxylate, is suitably selected from a wide range of such compounds, as disclosed, for example, in U.S. Pat. No. 3,956,401. Illustrative linear alcohol alkoxylates are shown by the formula:

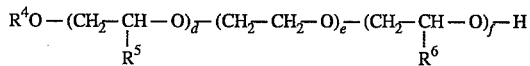

wherein $R^4$ is a linear, alkyl hydrocarbon having, for example, an average of from about 7 to about 10 carbon atoms, $R^5$ is a linear, alkyl hydrocarbon of about 1 to about 4 carbon atoms, $R^6$ is a linear, alkyl hydrocarbon of about 1 to about 4 carbon atoms, d is an integer of about 1 to about 6, e is an integer of about 4 to about 15, and f is an integer of about 4 to about 25.

Useful linear alcohol alkoxylates are commercially available, for example, under the registered trademark POLY-TERGENT® SL-42, a product of Olin Corporation. If desired, the alcohol alkoxylate is suitably end-capped with a lower alkyl group, and such a product is commercially available as POLYTERGENT® SLF-18, a propylene oxide capped linear alcohol alkoxylate that is also a product of Olin Corporation, and these end-capped linear alcohol alkoxylates have been found by the present inventors to provide desirably low foaming during use. Also advantageous for use in accordance with the present invention is a surfactant within the group commercially available as POLY-TERGENT® SLF-18B series surfactants, which are surfactants characterized by enhanced biodegradability and are also products of Olin Corporation, which are alkene oxide capped linear alcohol alkoxylates, containing ethylene oxide moieties in the backbone, and suitably also containing at least one propylene oxide moiety in the backbone, as disclosed, for example, in U.S. Pat. Nos. 4,925,587 and 4,898,621. Use of the POLY-TERGENT® SLF-18 and/or POLY-TERGENT® SLF-18B surfactants to comprise the diluent (component (c)) in accordance with the present invention has been found by the present inventors to avoid the need for an antifoaming agent in the concentrates and working compositions of the present invention.

Nonionic surfactants useful as component (c) include. Tergitol XL-80N surfactant, a trademarked product of Union Carbide Chemicals and Plastics Technology Corp., Danbury, Conn. Tergitol XL-80N is a mixture of $C_8$–$C_{10}$ ethoxylated and propoxylated primary alcohols having an average molecular weight of approximately 420. The mixture decomposes rather than boils upon heating, and has a flash point of 425° F. (Cleveland open cup ASTM D 92.218 C). It has a freezing point of −3° C., a specific gravity of 0.98 at 20° C. and is a cloudy liquid which is fully soluble in water.

Commercially available nonionic surfactants useful as component (c) include NEODOL® 91-6 surfactant, a trademarked surfactant product of Shell Chemical Company, Geismar, La. NEODOL® 91-6 surfactant is a detergent range mixture of $C_9$–$C_{11}$ linear primary alcohol ethoxylates having an average of 6 moles of ethylene oxide per mole of alcohol. NEODOL® 91-6 is a slightly viscous liquid having a pour point of 45° F. and a melting point of 42°–48° F. Its solubility in water is complete, although at high concentrations the product may form a gel with water. NEODOL® 91-6 surfactant contains less than 6 parts per million ethylene oxide. NEODOL® 91-6 surfactant possesses a hydroxyl number of 126–140 milligrams potassium hydroxide per gram.

While these commercially-available surfactants are suitable for use as component (b) in the present invention, other surfactants within a wide range of molecular weights can also be successfully employed a component (c) in aqueous or organic solvent solution. For example, surfactants with linear $C_9$–$C_{11}$ carbon chains and five or six EO or PO groups are expected to provide desirable results.

An antifoaming agent (also referred to herein as a "defoaming agent" or "defoamer") is optionally employed in accordance with the process of the present invention. The antifoaming agent is suitably incorporated into either the concentrate or the working composition in accordance with the present invention since foaming can sometimes occur either by virtue of agitation of the formulation during fiber dyeing or fiber cleaning with the "working" composition, or during dilution or mixing encountered during the preparation or use of the concentrate. The degree of foaming depends to a large extent upon the specific compounds selected for components (a) and (b), as well as upon the physical method employed for fiber dyeing, fiber cleaning or concentrate dilution. Illustrative defoamers include silicon oils, mineral oils, modified alcohol ethoxylate, EO/PO block copolymers, phosphate ester, hydrophobic silica, and Fatty alcohols as well as blends of these defoamers. Other useful antifoaming agents include liquid silicone emulsions manufactured and sold by Dow Corning Corporation (Midland, Mich.) under its trademarks "DOW CORNING® X2-1410 ANTIFOAM® and "DOW CORNING® X2-2210 ANTIFOAM". The antifoaming agent should be selected and employed at a concentration such that the detergency of the surfactant(s) and the corrosion inhibition of the hydroxylaminesubstituted organosulfonate are not unduly reduced. The antifoaming agent, if used, is desirably employed in the formulation at a concentration of 0.01 to 2 percent by weight, preferably at about 0.02 percent by weight. The concentration of the defoaming agent in the concentrate will be 5 to 20 times greater than in the working composition.

In accordance with the present invention, the fibers are either dye-leveled and dyed simultaneously from a single bath containing both the dye leveling agent and the dye, or the fibers can be pretreated with the dye-leveling agent prior to the dyeing step. The pH of the composition concentrates and the working compositions for dye-leveling can vary over a wide range, although pHs of between about 5 and about 9, preferably between about 6 and about 9, are particularly advantageous.

Although the dye-leveling agents of the present invention are suitably employed with a wide variety of dyes, they are particularly suitable for use in conjunction with acid dyes or dispersed (or so-called "emulsion") dyes. The acid dyes are well-known in the art, and are also referred to herein as "acid dyestuffs". These acid dyes are typically applied to polyester fibers or polyamide-containing natural or synthetic fibers such as nylon, wool, and silk. Suitable fiber materials made from synthetic polyamide, which can be dyed using the process according to the invention, are, e.g., condensation products from hexamethylenediamine and adipic acid (Polyamide 6.6) or sebacic acid (Polyamide 6.10) or mixed condensation products, e.g. from hexamethylenediamine, adipic acid and E-caprolactam (Polyamide 6.6/6), also the polymerization products from E-caprolactam, known under the tradenames of Polyamide 6, "Perion", "Grilon" or "Enkalon", or w-aminoundecanoic acid (Polyamide 11 or "Rilsan"). These fibers can be treated with the compositions of the present invention at any stage of processing, that is to say, e.g. in the form of threads, yarns, knitted goods, and fabrics.

The dye-leveling composition (also referred to herein as the "dye-leveling agent") useful in accordance with the present invention is typically applied to the fiber in a "dye-leveling effective amount". As used herein, the term "dye-leveling effective amount" designates an amount sufficient to provide an even dye appearance on the fiber upon application of dye to the fiber. Preferably, the dye-leveling agent is applied to the fiber in an amount of between about 0.5 and about 5 weight percent (preferably between about 1 and about 4 weight percent) based upon the total weight of the goods being dyed.

The dye-leveling agent of the present invention is suitably employed in the presence or absence of a solvent. Suitable solvents, if used, include alcohols, glycol or ether, such as methanol, butanol, diethylene glycol, tetrahydrofuran, or propylene glycol monoethyl ether or the like. If used, the solvent is employed in an amount of between 10 and about 50 weight percent (preferably between 10 and 40 weight percent) based upon the total weight of the formulation.

Acid dyestuffs, suitable for use in accordance with the invention, can belong to very diverse classes of dyestuffs. These can be, for example, the commercially important dyestuff classes of the azo, anthraquinone, phthalocyanine, nitro, or formazane dyestuffs which can also contain metals bound in complex linkage such as copper, nickel, chromium, or cobalt. Suitable azo dyestuffs are, principally, monoazo dyestuffs, e.g. of the type phenylazobenzene, phenylazonaphthalene, phenylazohydrox- or aminopyrazole, phenylazoacyloacetyl-arylamide, or those of the analogous naphthylazo series, whereby the aromatic nuclei can be suitably substituted. Also suitable are bis- and polyazo dyestuffs. The azo dyestuffs, to which also belong the formazane dyestuffs, can be metallized, principally by chromium or cobalt, but also by copper or nickel, whereby 1 or 2 dyestuff molecules per metal ion participate in the complex.

Typically, the dye is utilized in a "dye effective amount" i e an amount sufficient to cause a desired coloration of the fiber. Preferably, the dye is used in an amount of between about 0.1 and about 10.0 weight percent, based upon the total weight of the goods being dyed.

The reaction conditions employed in fabricating the compositions and composition concentrates of the present invention and the present process should not be limited to any particular conditions. It is preferred to carry out the reaction steps at a temperature of between about 25° C. and about 150° C. Reaction pressure can be selected as desired. Typically, super- or sub-atmospheric reaction pressure is not necessary for the reactions employed in the processes of the present invention. Atmospheric pressure is preferred in order to avoid the expense of special reaction vessels. However, elevated pressures can be used, if desired, and these superatmospheric pressures of up to 10 atmospheres or higher are suitably utilized if desired.

The following examples are intended to illustrate, but in no way limit the scope of, the present invention.

EXAMPLES

The following examples were carried out in order to demonstrate the efficacy of the compositions of the present invention as dye-leveling compositions in the dyeing of fibers. All parts and percentages are by weight and all temperatures are by degrees Celsius, unless explicitly stated otherwise.

Example 1

A premier Cafcamo high intensity mixer at torque of 500 to 1,000 rpm was used to blend a premix of 40 grams of POLY-TERGENT® 2A-1 acid (Alkyl diphenylether disulfonate acids) and 8.245 grams hydroxylamine neutralized with POLY-TERGENT® 2A-1 acid to pH of 6, then it was mixed until totally homogeneous. The resulting "intermediate blend" contained 80 percent of solids on a dry-weight basis.

A premier Cafcamo high intensity mixer at a torque of between 500 and 1,000 rpm was used to mix 7.136 grams of POLY-TERGENT® CS-1 acid (polycarboxylated linear alcohol alkoxylate) into 21.407 grams POLY-TERGENT® SL-42 (linear alcohol alkoxylate) until it was in solution. To this mixture was added 40 grams of the above 80 percent active intermediate blend component and 0.7196 grams of defoamer was then added. The resulting blend was mixed until it was totally homogeneous. Following homogenizing, 2.106 grams of 50% NaOH was added to neutralize the POLY-TERGENT® CS-1 acid and the resulting blend was mixed for 20 minutes. This final blend was performance tested using Barre', Transfer and Draves Wetting tests as described in detail below. The performance of the final blend showed good dye-leveling, transfer and wetting against the standard, namely POLY-TERGENT® 2A-1 surfactant above.

Example 2

A premier Cafcamo high intensity mixer at torque of 500 to 1,000 rpm was used to blend a premix of POLY-TERGENT® 2A-1 surfactant organic sodium sulfonate, and hydroxylamine hydrochloride, and the resulting mixture was titrated to a pH of 6, while mixing until totally homogeneous. The resulting intermediate blend contained 80 percent of solids on a dry weight basis.

This intermediate blend was formulated into a final blend following the procedure of Example 1.

Example 3

A premier Cafcamo high intensity mixer at torque of 500 to 1,000 rpm was used to mix the solution of POLY-TERGENT® 2A-1 acid (i.e., Alkyl diphenylether disulfonate acid) is titrated to pH 6 using hydroxylamine hydrate. The solution was mixed until totally homogeneous. The resulting intermediate blend contained 80 percent of solids on a dry weight basis.

This intermediate blend was formulated into a final blend following the procedure of Example 1.

Performance Testing Procedures:

The following procedures which were performed to evaluate the dye levelling agent in textile applications.

Procedure #1—Barre' Test—Description of the Test Used

A 10 gram swatch of Tiger cloth is processed in a dye bath with a 40:1 liquor to goods ratio containing 0.12% Tectilon Blue 4RS, 0.12% Tectilon Red 2 BN, 0.18% Tectilon Orange 3G, 0.2% ammonium sulfate, and the dye levelling formulation at a 2% level. The dye bath is adjusted to pH 6 and heated at 1 degree Celsius per minute. The dye bath is then held at the boiling point for 30 minutes. After drying, sample measurements were obtained for lightness (L Value) on the HunterLab ColorQUEST 45/0 Spectrocolorimeter. A total of 6 readings each were averaged on both the dark band and the light band of the Tiger cloth.

Procedure #2—Transfer Test

A 6 gram swatch of Nylon 6,6 carpet is processed in a dye bath with a 40:1 liquor to goods ratio containing 0.36% Tectilon Blue 4RS, 0.36% Tectilon Orange 3G, 0.30% Tectilon Red 2 BN, 0.2% ammonium sulfate, and no dye levelling agent. The dye bath is adjusted to pH 6 and heated at 1 degree Celsius per minute. The dye bath is held for 1 hour at the boiling point. The sample is dried in a 50 degree Celsius oven. An undyed swatch is cut to the weight of the original (dried) swatch and along with the original swatch is placed in a second bath containing 0.2% ammonium sulfate and the dye levelling formulation at a 2% level. The dye bath is adjusted to pH 6, heated at 1 degree Celsius per minute, and held for 1 hour at the boiling point. After drying, samples are measured for lightness on the HunterLab ColorQUEST 45/0 Spectrocolorimeter total of five readings were made on each swatch.

Procedure #3—Draves Wetting Test

Evaluation of the wetting property for the dye levelling agent was made according to ASTM D2281-68 (Reapproved 1986). One gram of the dye levelling agent per 500 mL of distilled water was thoroughly mixed in a graduated cylinder. A 3 gram hook was hung on a Nylon 6,6 skein and dropped into the cylinder. Time measurement (in seconds) was started as the skein was released into the solution and stopped when the skein definitely began to sink. Determinations were made in seconds at 75, 120, and 160 degrees Fahrenheit for the dye levelling agent against the POLY-TERGENT® 2A-1 standard.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A composition concentrate comprising:
   (a) a hydroxylamine-substituted organosulfonate,
   (b) an organic or inorganic salt of a polycarboxylated alcohol alkoxylate, and
   (c) an alcohol alkoxylate,
   wherein the amount of component (a) is between about 20 and about 75 weight percent, component (b) is present in an amount of between about 2.5 and about 25 weight percent, and component (c) being between about 10 and about 75 weight percent, all weight percents being based upon the weight of said composition concentrate.

2. The composition concentrate of claim 1 wherein said hydroxylamine-substituted organosulfonate is produced by reacting an aralkyl ether sulfonic acid with a hydroxylamine salt selected from the group consisting of hydroxylammonium nitrate, hydroxylammonium sulfate, and combinations thereof.

3. The composition concentrate of claim 1 wherein said aralkyl ether sulfonic acid is selected from the group consisting of alkylated diphenyl oxide sulfonic acid having at least one alkylsubstitution on a phenyl ring and wherein said alkyl-substitution is selected from the group consisting of linear, branched, and cyclic alkyl substitutions, and combinations thereof.

4. The composition concentrate of claim 1 wherein said polycarboxylated alcohol alkoxylate is selected from the group consisting of polycarboxylated linear alcohol alkoxylates, polycarboxylated branched alcohol alkoxylates, polycarboxylated cyclic alcohol alkoxylates, and combinations thereof.

5. A composition comprising water and the concentrate of claim 1, said concentrate being present in said composition in an amount of between about 0.01 weight percent and about 20 weight percent, based upon the weight of said composition.

6. A method of dyeing a fiber which comprises contacting the fiber with the composition of claim to provide a treated fiber having said composition adhering to the outer surface thereof, and simultaneously or subsequently contacting the fibers with a dye, thereby causing the dye to adhere evenly to the outer surface of said fiber.

7. An aqueous composition comprising the concentrate of claim 1 plus additional water, said concentrate being present in said composition in an amount of between about 0.01 weight percent and about 50 weight percent, based upon the weight of said composition.

8. A composition comprising:
   (a) the reaction product of a hydroxylamine salt and an alkyl diphenyl ether sulfonic acid,
   (b) the reaction product of a base and a polycarboxylated linear alcohol alkoxylate acid, and
   (c) a linear alcohol alkoxylate.

9. The composition of claim 8 wherein said hydroxylamine salt selected from the group consisting of hydroxylammonium nitrate, hydroxylammonium sulfate, and combinations thereof.

10. The composition concentrate of claim 8 wherein said aralkyl ether sulfonic acid is selected from the group consisting of alkylated diphenyl oxide sulfonic acid having at least one alkylsubstitution on a phenyl ring and wherein said alkyl-substitution is selected from the group consisting of linear, branched, and cyclic alkyl substitutions, and combinations thereof.

11. The composition concentrate of claim 8 wherein said polycarboxylated alcohol alkoxylate is selected from the group consisting of polycarboxylated linear alcohol alkoxylates, polycarboxylated branched alcohol alkoxylates, polycarboxylated cyclic alcohol alkoxylates, and combinations thereof.

12. A composition useful for dyeing fibers comprising (a) a dye and (b) a dye-leveling agent comprising:

(1) the reaction product of a hydroxylamine salt and an alkyl diphenyl ether sulfonic acid, (2) the reaction product of a base and a polycarboxylated linear alcohol alkoxylate acid, and (3) a linear alcohol alkoxylate, said dye-leveling agent being present in a dye-leveling effective amount.

* * * * *